(12) United States Patent
Deguchi et al.

(10) Patent No.: US 7,963,870 B2
(45) Date of Patent: Jun. 21, 2011

(54) BICYCLE REAR DERAILLEUR

(75) Inventors: Tomoya Deguchi, Osaka (JP); Yoshinori Irie, Osaka (JP)

(73) Assignee: Shimano Inc., Osaka (JP)

( * ) Notice: Subject to any disclaimer, the term of this patent is extended or adjusted under 35 U.S.C. 154(b) by 32 days.

(21) Appl. No.: 12/113,235

(22) Filed: May 1, 2008

(65) Prior Publication Data

US 2009/0275429 A1    Nov. 5, 2009

(51) Int. Cl.
 F16H 9/00    (2006.01)
 F16H 59/00   (2006.01)
 F16H 61/00   (2006.01)
 F16H 63/00   (2006.01)

(52) U.S. Cl. ............................................ 474/80; 474/82
(58) Field of Classification Search ............... 474/78, 474/79, 80, 82, 83
 See application file for complete search history.

(56) References Cited

U.S. PATENT DOCUMENTS

| | | | | | |
|---|---|---|---|---|---|
| 1,046,600 | A | * | 12/1912 | Kahler | 411/374 |
| 1,212,126 | A | * | 1/1917 | Canfield | 411/215 |
| 1,328,053 | A | * | 1/1920 | Munhall | 411/380 |
| 1,394,543 | A | * | 10/1921 | Flannery et al. | 411/380 |
| 1,507,841 | A | * | 9/1924 | Landgraf | 411/380 |
| 1,525,871 | A | * | 2/1925 | Levandofsky | 411/205 |
| 1,603,579 | A | * | 10/1926 | Budwell | 411/381 |
| 1,867,296 | A | * | 7/1932 | Woodruff | 285/341 |
| 1,957,533 | A | * | 5/1934 | Gelpcke | 411/24 |
| 2,827,303 | A | * | 3/1958 | Herbenar | 280/124.136 |
| 3,081,808 | A | * | 3/1963 | Rosan et al. | 411/178 |
| 3,138,987 | A | * | 6/1964 | Wing | 411/4 |
| 3,141,488 | A | * | 7/1964 | Wootton | 411/108 |
| 3,181,413 | A | * | 5/1965 | Wing | 411/34 |
| 3,245,450 | A | * | 4/1966 | Sauter | 411/349 |
| 3,319,209 | A | * | 5/1967 | Reyenga | 338/162 |
| 3,943,818 | A | * | 3/1976 | Pryor et al. | 411/389 |
| 3,945,737 | A | * | 3/1976 | Herbenar | 403/27 |
| 4,154,544 | A | * | 5/1979 | Gair | 403/59 |
| 4,183,255 | A | * | 1/1980 | Leiter | 474/82 |
| 4,230,336 | A | * | 10/1980 | Avrea et al. | 280/507 |
| 4,290,337 | A | * | 9/1981 | Kuwata et al. | 411/2 |
| 4,323,357 | A | * | 4/1982 | Nagano | 474/82 |
| 4,406,643 | A | * | 9/1983 | Shimano | 474/82 |
| 4,530,677 | A | * | 7/1985 | Nagano | 474/80 |
| 4,670,000 | A | * | 6/1987 | Nagano | 474/80 |

(Continued)

FOREIGN PATENT DOCUMENTS

DE    1055982 B    4/1959

(Continued)

OTHER PUBLICATIONS

German Search Report of corresponding German Application No. 10 2009 005 199.6 dated Feb. 9, 2011.

*Primary Examiner* — Michael R Mansen
*Assistant Examiner* — Henry Liu
(74) *Attorney, Agent, or Firm* — Global IP Counselors, LLP

(57) ABSTRACT

A base member is provided for a bicycle rear derailleur that basically comprises a housing portion and a fixing bolt. The housing portion is provided with a blind bore. The fixing bolt has a first portion rotatably supported by the housing portion within the blind bore and a second portion projecting from the housing portion. The second portion has a thread formed thereon and a tool engagement structure to rotate the fixing bolt relative to the housing portion.

8 Claims, 8 Drawing Sheets

U.S. PATENT DOCUMENTS

| | | | | |
|---|---|---|---|---|
| 4,692,131 | A * | 9/1987 | Nagano | 474/80 |
| 4,744,784 | A * | 5/1988 | Nagano | 474/80 |
| 4,749,299 | A * | 6/1988 | Swanson | 403/27 |
| 4,789,282 | A * | 12/1988 | Abraham | 411/24 |
| 4,838,837 | A * | 6/1989 | Testa | 474/80 |
| 4,838,987 | A * | 6/1989 | Dobson | 438/8 |
| 4,840,605 | A * | 6/1989 | Testa | 474/80 |
| 4,850,940 | A * | 7/1989 | Nagano | 474/80 |
| 4,906,036 | A * | 3/1990 | James | 292/202 |
| 5,152,720 | A * | 10/1992 | Browning et al. | 474/80 |
| 5,205,692 | A * | 4/1993 | Kelbert et al. | 411/173 |
| 5,280,941 | A * | 1/1994 | Guhlin | 280/507 |
| 5,295,916 | A * | 3/1994 | Chattin | 474/78 |
| 5,395,131 | A * | 3/1995 | Herrick | 280/507 |
| 5,498,211 | A * | 3/1996 | Hsu | 474/80 |
| 5,553,960 | A * | 9/1996 | Turer et al. | 403/2 |
| 5,624,335 | A * | 4/1997 | Ando | 474/80 |
| 5,836,844 | A * | 11/1998 | Yoshida | 474/80 |
| 5,904,436 | A * | 5/1999 | Maughan et al. | 403/140 |
| 5,919,106 | A | 7/1999 | Ichida | |
| 6,135,905 | A * | 10/2000 | Soon | 474/82 |
| 6,146,045 | A * | 11/2000 | Maughan | 403/165 |
| 6,350,212 | B1 * | 2/2002 | Campagnolo | 474/80 |
| 6,394,921 | B1 * | 5/2002 | Fukuda | 474/80 |
| 6,447,413 | B1 * | 9/2002 | Turer et al. | 474/80 |
| 6,902,504 | B2 * | 6/2005 | Fukuda | 474/83 |
| 7,101,131 | B2 * | 9/2006 | Herb | 411/84 |
| 7,189,172 | B2 * | 3/2007 | Shahana et al. | 474/80 |
| 7,396,304 | B2 * | 7/2008 | Shahana | 474/82 |
| 2007/0025905 | A1 | 2/2007 | Yamaguchi | |

FOREIGN PATENT DOCUMENTS

| | | |
|---|---|---|
| DE | 1206748 B | 12/1965 |
| EP | 0 075 927 A2 | 4/1983 |
| EP | 0 191 710 A2 | 8/1986 |
| FR | 2639313 A1 | 5/1980 |

\* cited by examiner

BICYCLE REAR DERAILLEUR

BACKGROUND OF THE INVENTION

1. Field of the Invention

The present invention generally relates to a bicycle rear derailleur. More specifically, the present invention relates to base member of a bicycle rear derailleur which is mounted on the frame of a bicycle.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle rear derailleur.

A bicycle rear derailleur is used to selectively engage a chain with one of a plurality of sprockets that rotate with the rear wheel of the bicycle. A typical rear derailleur comprises a base member, a movable member supporting a chain guide and a pair of links coupled between the base member and the movable member so that the chain guide moves laterally relative to the base member. The base member usually is mounted to the rear end of the bicycle frame by a mounting bolt that screws into a threaded opening formed in the rear end of the bicycle frame. The chain guide moves the chain in order to transfer the chain to one of the rear sprockets. The chain guide typically has an outside plate member, an inside plate member, a guide pulley rotatably mounted between the two plate members at first ends of the two plate members, and a tension pulley rotatably mounted between both plate members at the other ends of both plate members.

In use, one end of an operating cable is typically connected to one of the links, and another end of the operating cable is connected to a shift control device mounted on the bicycle handlebar. When the rider operates the shift control device, the operating cable is pulled or released accordingly. The operating cable pulls or releases the link, which causes the link to pivot relative to the base member and move the chain guide laterally to shift the bicycle chain from one rear sprocket to another rear sprocket.

SUMMARY OF THE INVENTION

One object of the present invention is to provide a bicycle base member in which the fixing bolt is rotatably retained on the base member within the blind bore.

In accordance with a first aspect of the present invention, a base member is provided for a bicycle rear derailleur that basically comprises a housing portion and a fixing bolt. The housing portion is provided with a blind bore. The fixing bolt has a first portion rotatably supported by the housing portion within the blind bore and a second portion projecting from the housing portion. The second portion has a thread formed thereon and a tool engagement structure to rotate the fixing bolt relative to the housing portion.

In accordance with a second aspect of the present invention, a bicycle rear derailleur is provided that basically comprises a base member, a movable member and a moving mechanism. The base member includes a housing portion with a blind bore and a fixing bolt. The fixing bolt has a first portion rotatably supported in the blind bore of the housing portion and a second portion projecting from the housing portion. The second portion has a thread formed thereon and a non-circular tool engagement structure to rotate the fixing bolt relative to the housing portion. The movable member pivotally supports a chain guide. The moving mechanism is coupled between the housing portion of the base member and the movable member so that the movable member is movable relative to the base member.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
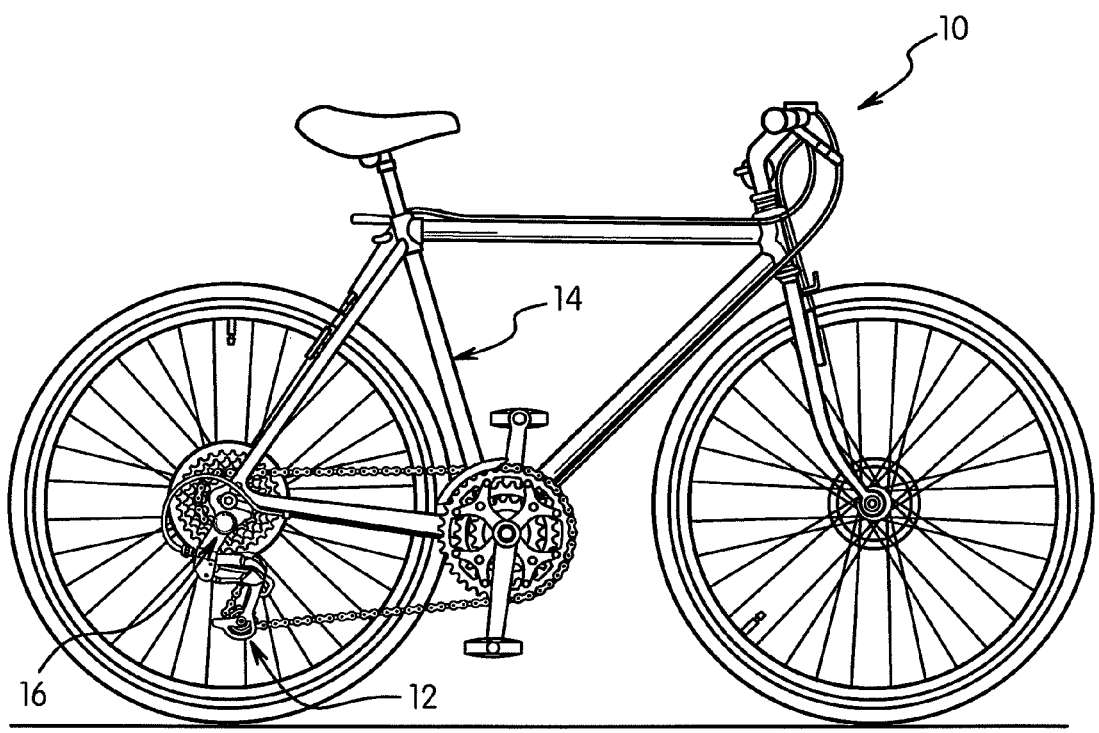
FIG. 1 is a side elevational view of a bicycle showing a rear derailleur in accordance with one embodiment.
Figure 2:
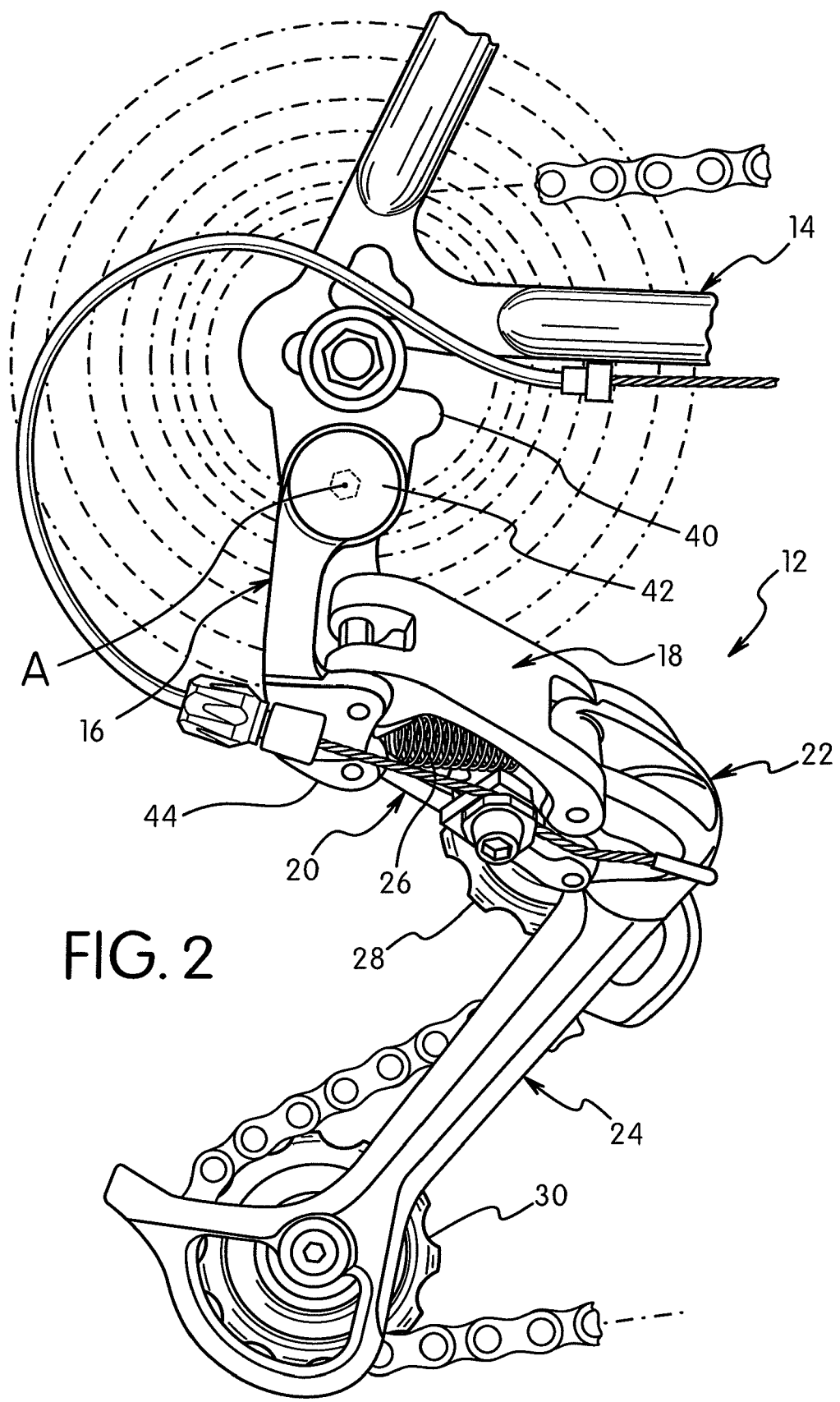
FIG. 2 is an enlarged outboard elevational view of the rear derailleur mounted to the bicycle frame.

Referring initially to FIGS. 1 and 2, a bicycle 10 is illustrated that is equipped with a bicycle rear derailleur 12 in accordance with a first embodiment. The bicycle 10 has a frame 14 in which the rear derailleur 12 is secured thereto as discussed below. The rear derailleur 12 basically includes a base member 16, a pair of links 18 and 20 and a movable member 22 with a chain guide 24 pivotally mounted to the movable member 22. The links 18 and 20 form a moving mechanism that is coupled between the base member 16 and the movable member 22 so that the movable member 22 is movable relative to the base member 16.

Basically, the rear derailleur 12 is conventional rear derailleur in which an inner wire of a Bowden cable assembly is coupled to one of the links 18 and 20 (e.g., the inner wire coupled to the link 20 in the illustrated embodiment) to move the movable member 22 and the chain guide 24 laterally relative to the base member 16. A coil spring 26 is connected to diagonally opposite pivot shafts so that links 18 and 20 are biased together. The chain guide 24 basically includes a pair of chain cage plates with an idler pulley 28 and a tension pulley 30 disposed between the plates. Generally speaking, the rear derailleur 12 can be any rear derailleur, and thus, the parts of the rear derailleur 12 will not be discussed or illustrated in detail herein, except for those parts that relate to the bicycle base member 16.

Figure 3:
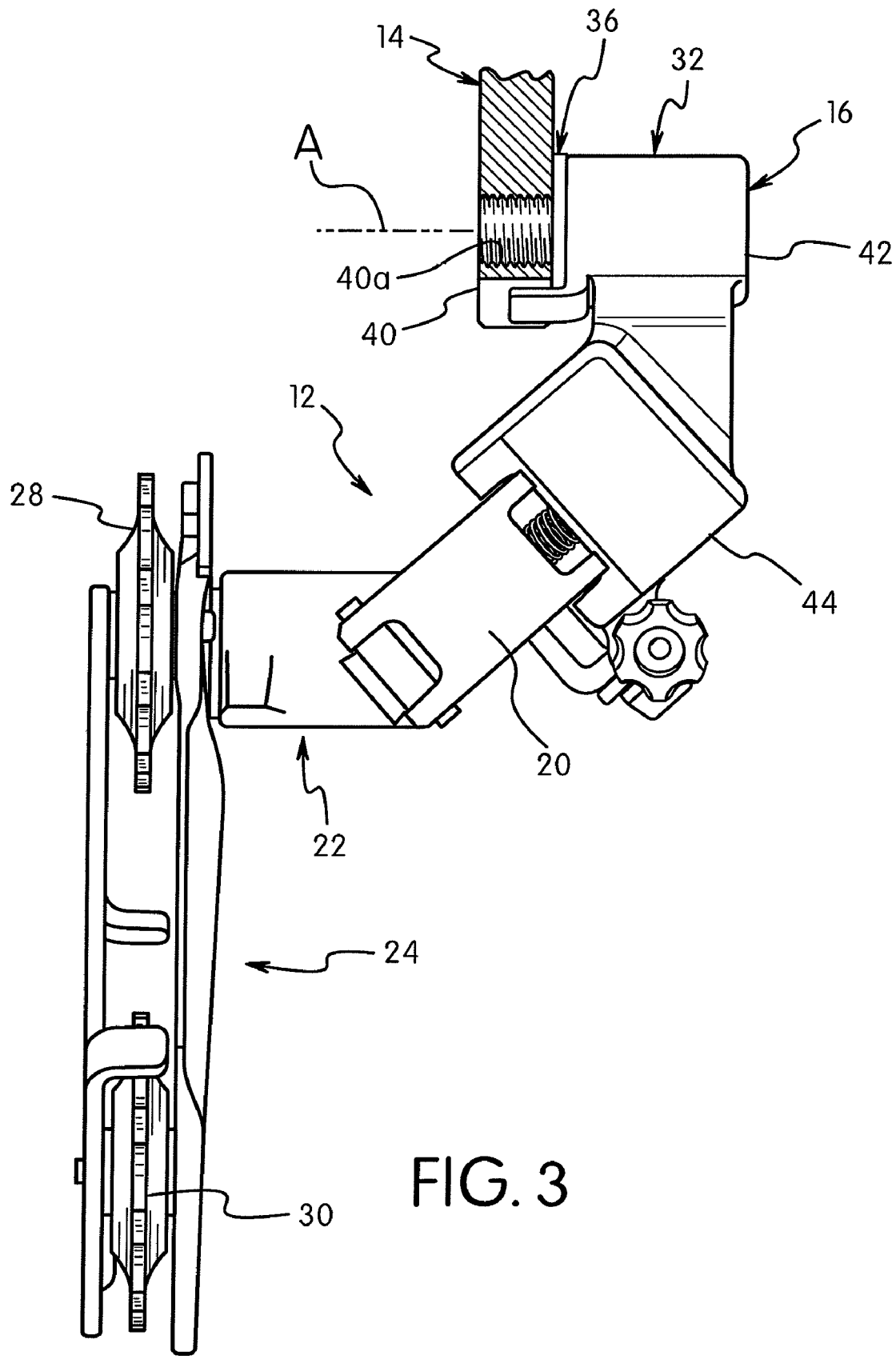
FIG. 3 is an enlarged, partial rear elevational view of the rear derailleur mounted to the bicycle frame.
Figure 4:
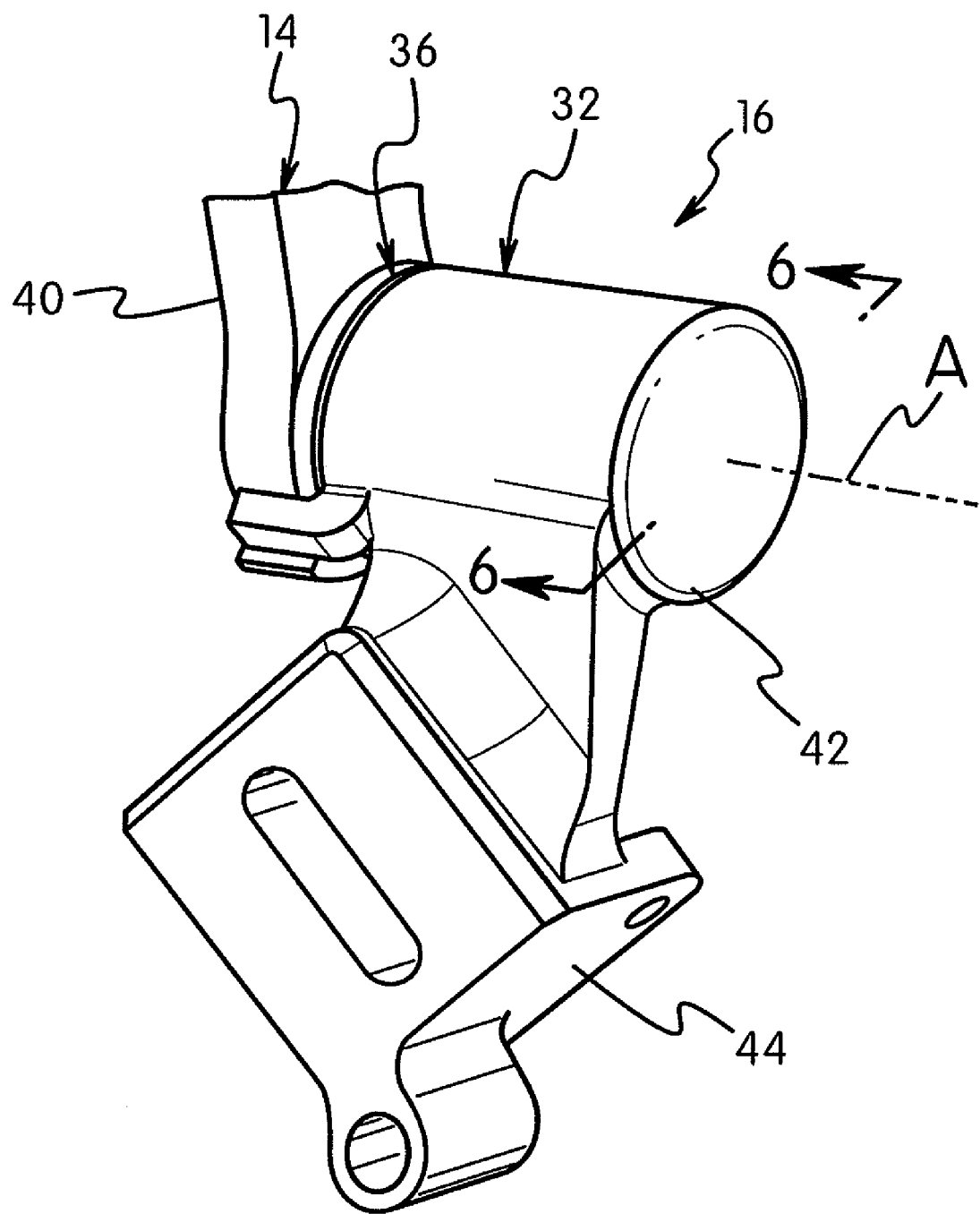
FIG. 4 is an enlarged, partial rear perspective view of the bicycle base member of FIGS. 2 and 3, with the bicycle base member mounted to the bicycle frame.
Figure 5:
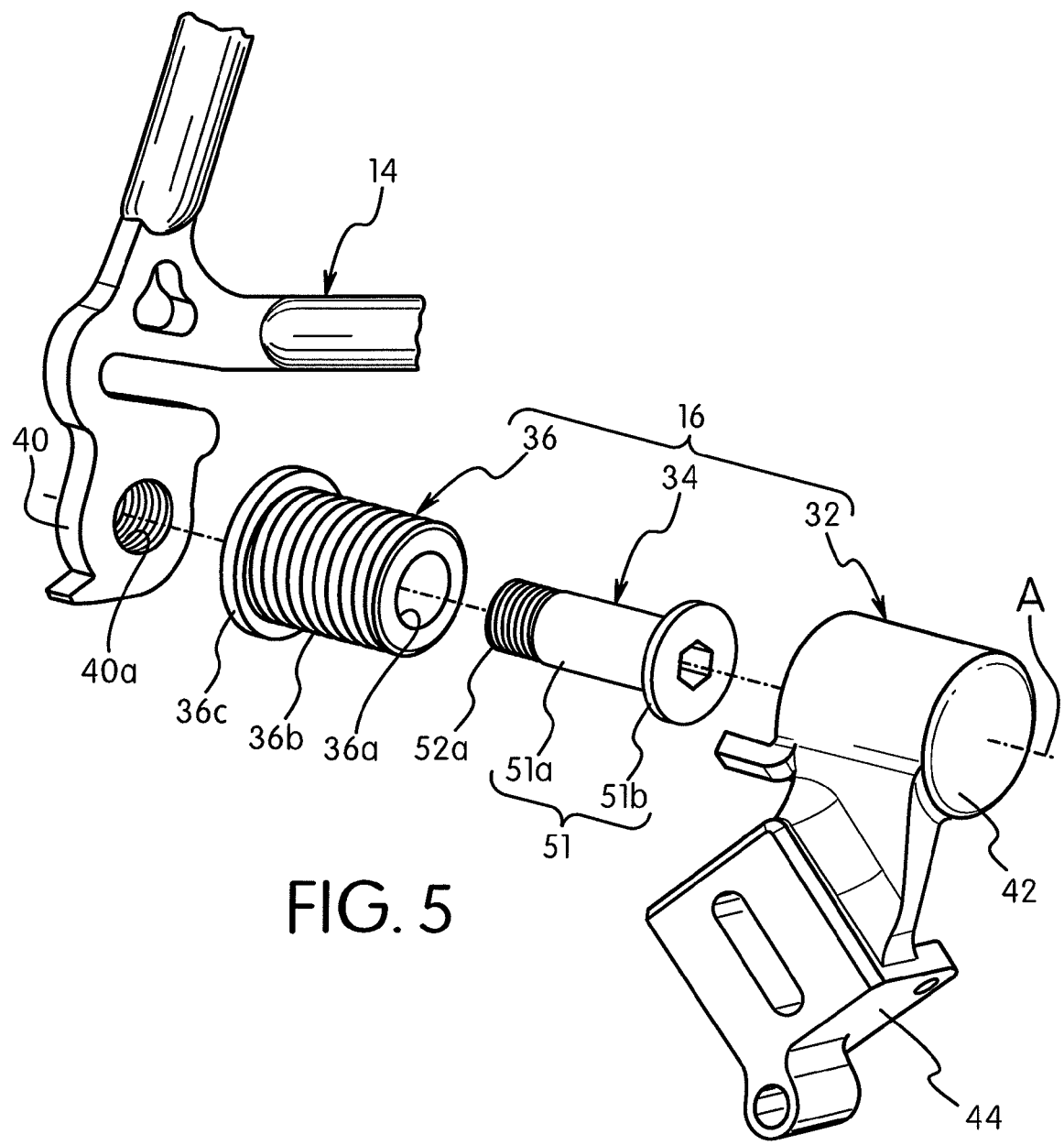
FIG. 5 is an exploded perspective view of view of a rear end of the bicycle frame and the bicycle base member of FIGS. 2 to 4.
Figure 6:
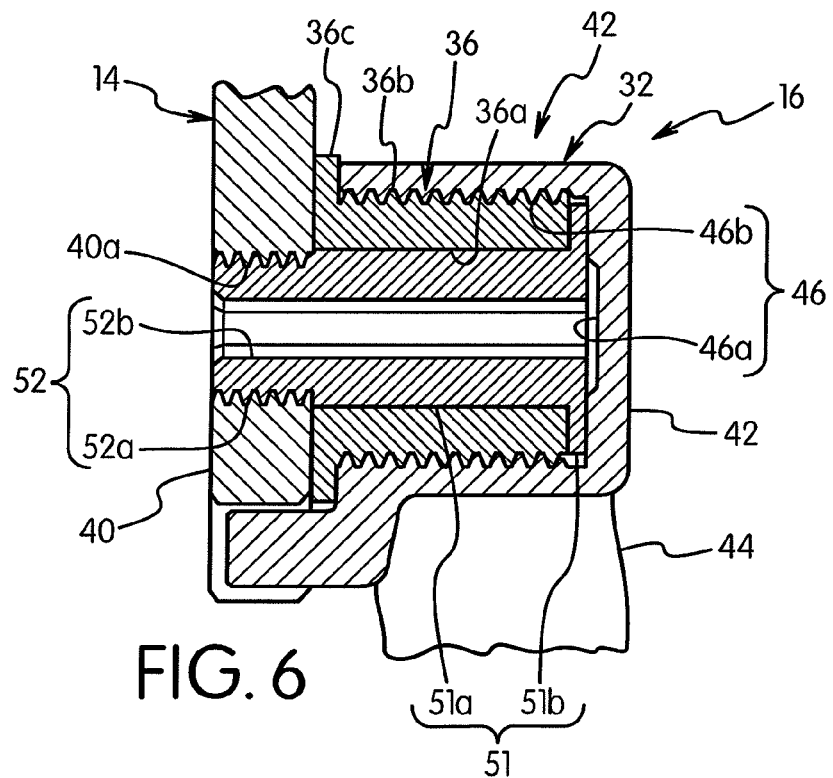
FIG. 6 is a cross sectional view of the bicycle base member of FIGS. 2 to 5 prior to be mounted to the bicycle frame.
Figure 7:
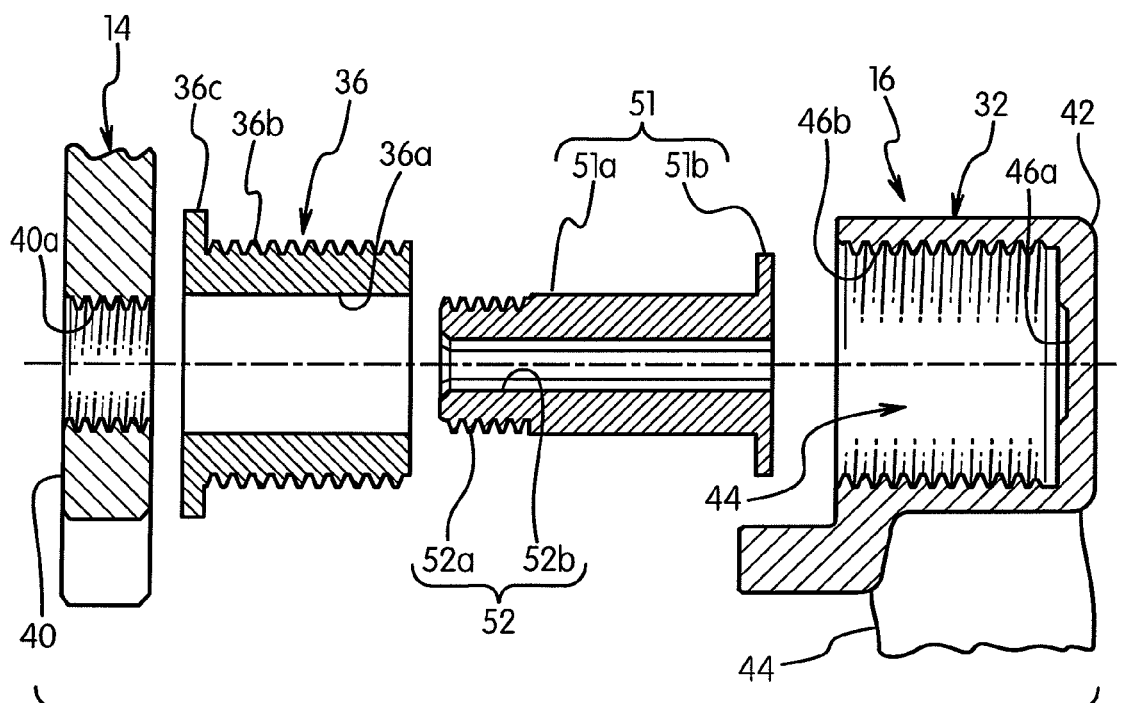
FIG. 7 is a cross sectional view of the bicycle base member mounted to the bicycle frame of FIGS. 2 to 6.

The base member 16 includes a housing portion 32, a fixing bolt 34 and a sleeve member 36. The fixing bolt 34 of the base member 16 secures the rear derailleur 12 to a rear mounting portion 40 of the frame 14 of the bicycle 10 as best seen in FIGS. 3 and 7.

The housing portion 32 is preferably constructed of a hard rigid material such as a lightweight metal. The housing portion 32 has a frame mounting part 42 and a link supporting part 44. The frame mounting part 42 has a blind bore 46 that rotatably receives the fixing bolt 34. The sleeve member 36 retains the fixing bolt 34 to the frame mounting part 42 of the housing portion 32. In particular, the blind bore 46 has a center axis A with an inner end 46a and an internal thread 46b on its inner periphery surface. The internal thread 46b threadedly receives the sleeve member 36 as discussed below.

In this embodiment, the fixing bolt 34 has a first portion 51 rotatably supported in the blind bore 46 of the housing portion 32 by the sleeve member 36 and a second portion 52 projecting from the housing portion 32. The first portion 51 includes a smooth shaft 51a and a radially extending annular flange 51b. The smooth shaft 51a is concentrically arranged within the sleeve member 36, while the annular flange 51b is disposed between an inner end of the sleeve member 36 and the inner end 46a of the blind bore 46. The second portion 52 includes a thread 52a and a non-circular tool engagement structure 52b. The thread 52a is configured to threadedly engage a threaded hole 40a in the frame 14. The non-circular tool engagement structure 52b is configured to receive a tool to rotate the fixing bolt 34 relative to the housing portion 32. In particular, the non-circular tool engagement structure 52b is a non-circular bore that extends axially inward of a free end surface of the second portion 52. In this embodiment, the non-circular bore of the non-circular tool engagement structure 52b is a hexagonally shaped as viewed along a center longitudinal axis of the fixing bolt 34.

The sleeve member 36 is a tubular member with a smooth center bore 36a, an external thread 36b and an abutment flange 36c. The center bore 36a rotationally supports the smooth shaft 51a of the fixing bolt 34. The external thread 36b of the sleeve member 36 threadedly engages with the internal thread 46b of the blind bore 46. The abutment flange 36c is configured and arranged to limit the amount that the sleeve member 36 can be threaded into the blind bore 46 so that a predetermined gap exists between the inner end of the sleeve member 36 and the inner end 46a of the blind bore 46. This predetermined gap is sized to be slightly larger than the thickness of the annular flange 51b as measured in an axial direction of the fixing bolt 34. Thus, a sufficient clearance exists between the inner end of the sleeve member 36 and the inner end 46a of the blind bore 46 to allow the fixing bolt 34 to rotate, but the clearance is small enough to substantially prevent axial movement of the fixing bolt 34 when the sleeve member 36 is fully threaded into the blind bore 46.

In this embodiment, the base member 16 does not include a stopper plate and/or a biasing element. However, the base member 16 can include a stopper plate rotatably mounted to the fixing bolt 34 with a torsion spring coaxially disposed on about the fixing bolt 34 to biased the base member 16 in a clockwise direction relative to the stopper plate as viewed along the fixing bolt 34 from the side of the bicycle where the rear derailleur 12 is attached. In this case, one end of a torsion spring is attached to the base member 16, and another end of the torsion spring is attached to the stopper plate. Often, an adjusting bolt that screws into the first stopper member to contact the abutment formed on the frame end. Such an arrangement for a rear derailleur is disclosed in U.S. Pat. No. 4,690,663 (assigned to Shimano, Inc.).

Accordingly, the base member 16 is assembled by first inserting the first portion 51 of the fixing bolt 34 into the blind bore 46 of the housing portion 32. Next, the sleeve member 36 is threaded into the blind bore 46 such that the external thread 36b and the internal thread 46b are threadedly engaged. The sleeve member 36 is threaded into the blind bore 46 until the abutment flange 36c contacts the housing portion 32 of the base member 16. At this point, the annular flange 51b is disposed between the inner end of the sleeve member 36 and the inner end 46a of the blind bore 46 to rotationally retain the first portion 51 of the fixing bolt 34 within the blind bore 46 of the housing portion 32. Now, the rear derailleur 12 can be attached to the frame 14 of the bicycle. Specifically, the second portion 52 with the thread 52a and the non-circular tool engagement structure 52b projects out from the blind bore 46 of the housing portion 32. Thus, the second portion 52 can then be threaded into the threaded hole 40a of the frame 14 by rotating the fixing bolt 34 using a tool that is inserted into the non-circular tool engagement structure 52b.

Second Embodiment

Figure 8:
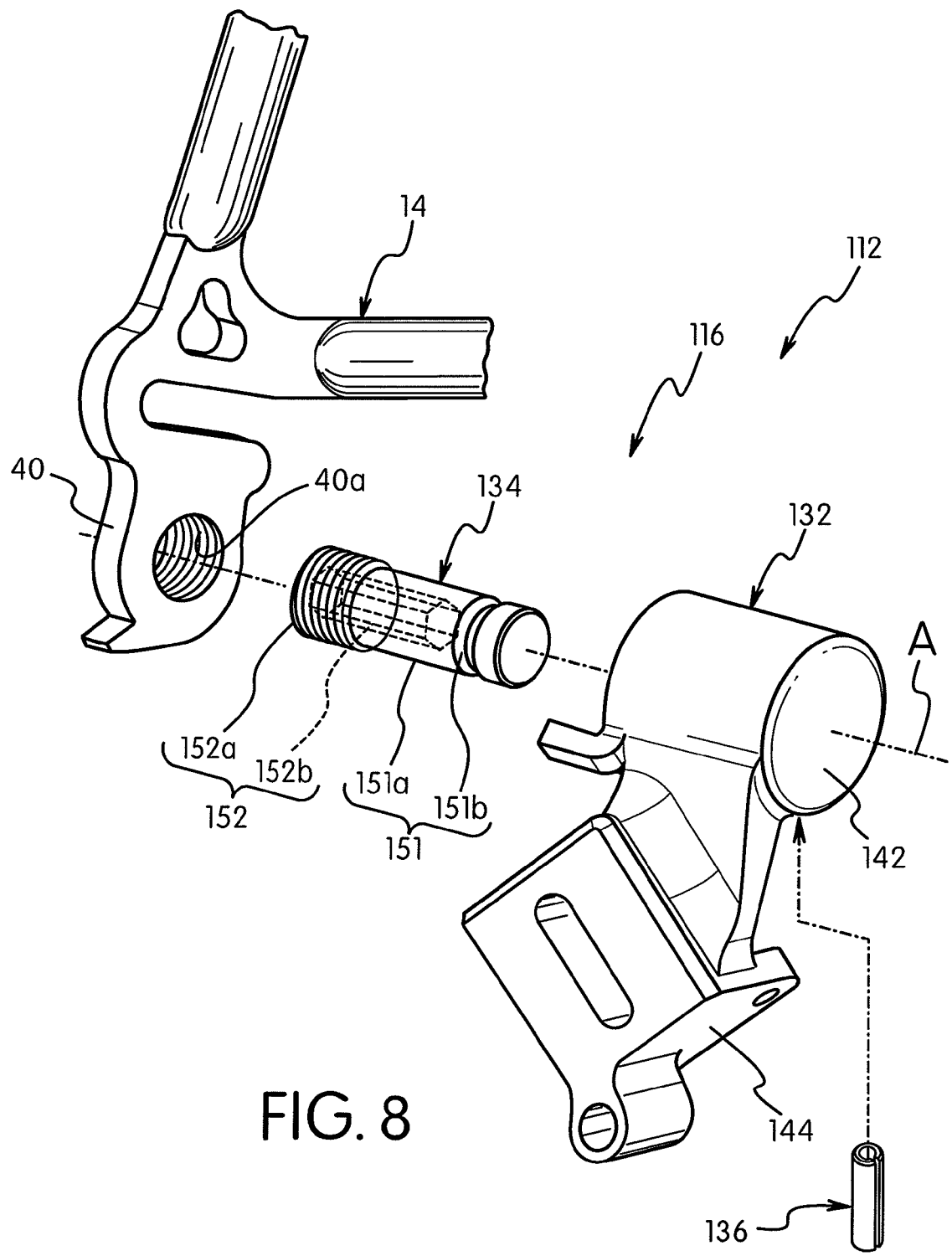
FIG. 8 is an exploded perspective view of view of the bicycle base member and the bicycle frame in accordance with another embodiment of the present invention.
Figure 9:
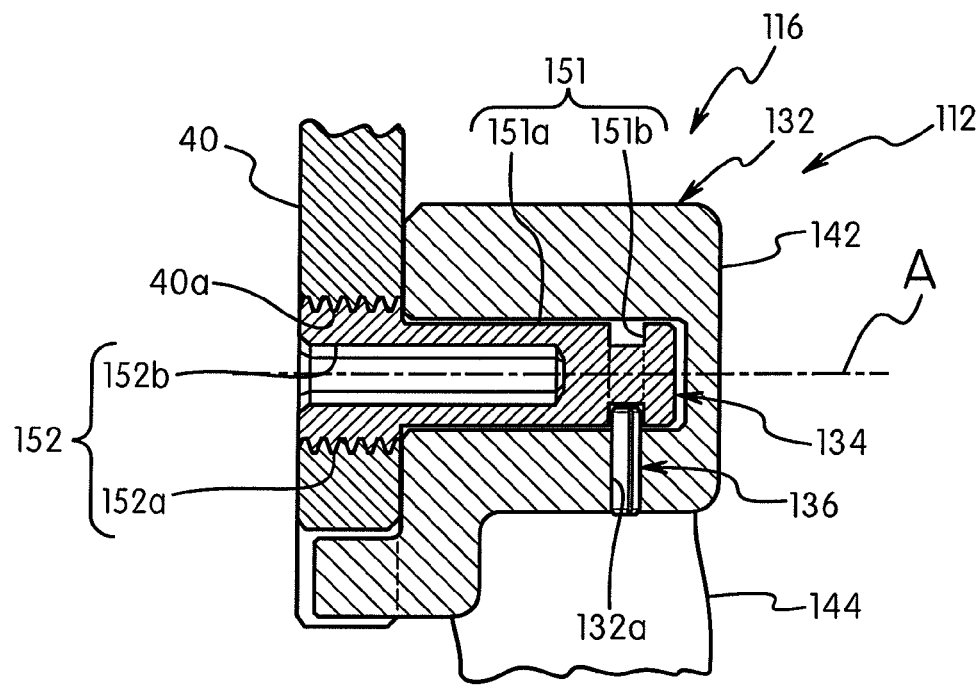
FIG. 9 is a cross sectional view of the bicycle base member of FIG. 8 prior to be mounted to the bicycle frame.
Figure 10:
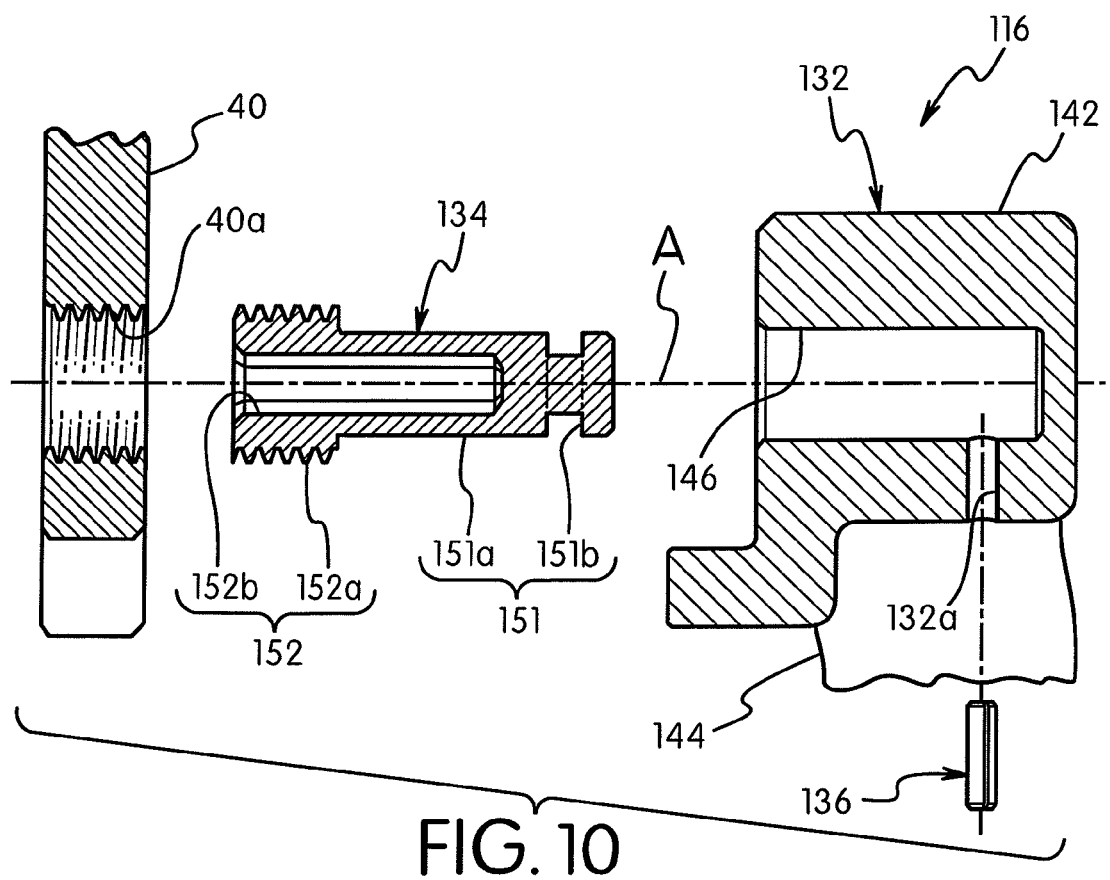
FIG. 10 is a cross sectional view of the bicycle base member of FIGS. 8 and 9 after being mounted to the bicycle frame.

Referring now to FIGS. 8, 9 and 10, a rear derailleur 112 in accordance with a second embodiment will now be explained. Basically, the rear derailleur 112 is identical to the rear derailleur 12, except that the base member 16 has been replaced with a base member 116. The rear derailleur 112 is attached to the rear mounting portion 40 of the frame 14 of the bicycle 10 of FIG. 1. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The base member 116 includes a housing portion 132, a fixing bolt 134 and a retaining member 136. The fixing bolt 134 of the base member 116 secures the rear derailleur 112 to the rear mounting portion 40 in the same manner as the first embodiment as best seen in FIG. 9.

The housing portion 132 is preferably constructed of a hard rigid material such as a lightweight metal. The housing portion 132 has a frame mounting part 142 and a link supporting part 144. The frame mounting part 142 has a blind bore 146 that rotatably receives the fixing bolt 134. In this embodiment, the blind bore 146 is a smooth bore with a center axis A. The retaining member 136 retains the fixing bolt 134 within the blind bore 146 of the frame mounting part 142 of the housing portion 132. In particular, the housing portion 132 has a hole 132a that receives the retaining member 136 via a press fit. The hole 132a has a center axis that is perpendicular to the center axis A of the blind bore 146. The retaining member 136 engages the fixing bolt 134 to retain the fixing bolt 134 within the blind bore 146 of the frame mounting part 142 of the housing portion 132.

In this embodiment, the fixing bolt 134 has a first portion 151 rotatably supported in the blind bore 146 of the housing portion 132 by the retaining member 136 and a second portion 152 projecting from the housing portion 132. The first portion 151 includes a smooth shaft 151a and an annular groove 151b. The smooth shaft 151a is concentrically arranged within the blind bore 146. The second portion 152 includes a thread 152a and a non-circular tool engagement structure 152b. The thread 152a is configured to threadedly engage the threaded hole 40a in the frame 14. The non-circular tool engagement structure 152b is configured to receive a tool to rotate the fixing bolt 134 relative to the housing portion 132. In particular, the non-circular tool engagement structure 152b is a non-circular bore that extends axially inward of a free end surface of the second portion 152. In this embodiment, the non-circular bore of the non-circular tool engagement structure 152b is a hexagonally shaped as viewed along a center longitudinal axis of the fixing bolt 134.

The retaining member 136 is a radially extending pin that is press fitted into the hole 132a of the housing portion 132. For example, the retaining member 136 can be a hollow tubular pin with a longitudinal slot so that the diameter of the retaining member 136 can be retracted to a smaller diameter during insertion of the retaining member 136 into the hole 132a of the housing portion 132. In this way, the retaining member 136 can be securely retained in the hole 132a of the housing portion 132. When the retaining member 136 is press fitted into the hole 132a of the housing portion 132, the inner tip of retaining member 136 is disposed in the groove 151b to rotationally retain the first portion 151 of the fixing bolt 134 within the blind bore 146 of the housing portion 132.

In this embodiment, the base member 116 does not include a stopper plate and/or a biasing element. However, the base member 116 can include a stopper plate rotatably mounted to the fixing bolt 134 with a torsion spring coaxially disposed on about the fixing bolt 134 to biased the base member 116 in a clockwise direction relative to the stopper plate as viewed along the fixing bolt 134 from the side of the bicycle where the rear derailleur 112 is attached. In this case, one end of a torsion spring is attached to the base member 116, and another end of the torsion spring is attached to the stopper plate. Often, an adjusting bolt that screws into the first stopper member to contact the abutment formed on the frame end. Such an arrangement for a rear derailleur is disclosed in U.S. Pat. No. 4,690,663 (assigned to Shimano, Inc.).

Accordingly, the base member 116 is assembled by first inserting the first portion 151 of the fixing bolt 134 into the blind bore 146 of the housing portion 132. Next, the retaining member or pin 136 is press fitted into the hole 132a of the housing portion 132 to rotatably retain the first portion 151 of the fixing bolt 134 in the blind bore 146 of the housing portion 132. Now, the rear derailleur 112 can be attached to the frame 14 of the bicycle 10. Specifically, the second portion 152 with the thread 152a and the non-circular tool engagement structure 152b projects out from the blind bore 146 of the housing portion 132. Thus, the second portion 152 can then be threaded into the threaded hole 40a of the frame 14 by rotating the fixing bolt 134 using a tool that is inserted into the non-circular tool engagement structure 152b, similar to the prior embodiment.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the rear derailleur 12 or 112, the following directional terms "forward, rearward, above, downward, vertical, horizontal, below and transverse" as well as any other similar directional terms refer to those directions of a bicycle equipped with the rear derailleur 12 or 112. Accordingly, these terms, as utilized to describe the rear derailleur 12 or 112 should be interpreted relative to a bicycle equipped with the rear derailleur 12 or 112 as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A base member of a bicycle rear derailleur comprising:
   a housing portion with a blind bore, an inner axial end face, and an outer axial end face facing away from the inner axial end face; and
   a fixing bolt having a first portion rotatably supported by the housing portion within the blind bore and a second portion projecting from the housing portion, with the first portion having a radially extending flange, and the second portion having a thread formed thereon and a tool engagement structure to rotate the fixing bolt relative to the housing portion,
   the housing portion including a sleeve member to rotationally retain the first portion of the fixing bolt within the blind bore of the housing portion, the sleeve member having a first end face which faces the inner axial end face of the blind bore and a second end face which partially defines an abutment flange, the abutment flange having an inner axial flange face facing the inner axial end face of the blind bore and abutting the outer axial end face of the housing portion at an open end of the blind bore that is opposite the inner axial end face of the blind bore, the abutment flange limiting axial movement of the sleeve member into the blind bore so that the first end face of the sleeve member and the inner axial end face of the blind bore define a predetermined gap while the abutment flange is abutting the housing portion at the open end of the blind bore.

2. The base member according to claim 1, wherein the second portion has a free end surface with the tool engagement structure being a non-circular bore extending axially inward of the free end surface of the second portion.

3. The base member according to claim 2, wherein the non-circular bore is hexagonally shaped as viewed along a center longitudinal axis of the fixing bolt.

4. A base member of a bicycle rear derailleur comprising:
a housing portion with a blind bore; and
a fixing bolt having a first portion rotatably supported by the housing portion within the blind bore and a second portion projecting from the housing portion, with the first portion having a radially extending flange, and the second portion having a thread formed thereon and a tool engagement structure to rotate the fixing bolt relative to the housing portion,
the housing portion including a sleeve member to rotationally retain the first portion of the fixing bolt within the blind bore of the housing portion, the sleeve member having an abutment flange at an open end of the blind bore which limits an amount that the sleeve member can be threaded into the blind bore so that a predetermined gap exists between an inner end of the sleeve member and an inner end of the blind bore,
the sleeve member being threadedly engaged with an internal thread of the blind bore of the housing portion to rotationally retain the first portion of the fixing bolt within the blind bore of the housing portion.

5. A bicycle rear derailleur comprising:
a base member including a fixing bolt and a housing portion with a blind bore, an inner axial end face, and an outer axial end face facing away from the inner axial end face, the fixing bolt having a first portion rotatably supported in the blind bore of the housing portion and a second portion projecting from the housing portion, with the first portion having a radially extending flange, and the second portion having a thread formed thereon and a non-circular tool engagement structure to rotate the fixing bolt relative to the housing portion,
the housing portion including a sleeve member to rotationally retain the first portion of the fixing bolt within the blind bore of the housing portion, the sleeve member having a first end face which faces the inner axial end face of the blind bore and a second end face which partially defines an abutment flange, the abutment flange having an inner axial flange face facing the inner axial end face of the blind bore and abutting the outer axial end face of the housing portion at an open end of the blind bore that is opposite the inner axial end face of the blind bore, the abutment flange limiting axial movement of the sleeve member into the blind bore so that the first end face of the sleeve member and the inner axial end face of the blind bore define a predetermined gap while the abutment flange is abutting the housing portion at the open end of the blind bore;
a movable member pivotally supporting a chain guide; and
a moving mechanism coupled between the housing portion of the base member and the movable member so that the movable member is movable relative to the base member.

6. The bicycle rear derailleur according to claim 5, wherein the second portion has a free end surface with the tool engagement structure being a non-circular bore extending axially inward of the free end surface of the second portion.

7. The bicycle rear derailleur according to claim 6, wherein the non-circular bore is hexagonally shaped as viewed along a center longitudinal axis of the fixing bolt.

8. A bicycle rear derailleur comprising:
a base member including a housing portion with a blind bore and a fixing bolt, the fixing bolt having a first portion rotatably supported in the blind bore of the housing portion and a second portion projecting from the housing portion, with the first portion having a radially extending flange, and the second portion having a thread formed thereon and a non-circular tool engagement structure to rotate the fixing bolt relative to the housing portion,
the housing portion including a sleeve member to rotationally retain the first portion of the fixing bolt within the blind bore of the housing portion, the sleeve member having an abutment flange at an open end of the blind bore which limits an amount that the sleeve member can be threaded into the blind bore so that a predetermined gap exists between an inner end of the sleeve member and an inner end of the blind bore, the sleeve member being threadedly engaged with an internal thread of the blind bore of the housing portion to rotationally retain the first portion of the fixing bolt within the blind bore of the housing portion;
a movable member pivotally supporting a chain guide; and
a moving mechanism coupled between the housing portion of the base member and the movable member so that the movable member is movable relative to the base member.

* * * * *